United States Patent [19]

Naujock

[11] Patent Number: 5,454,233
[45] Date of Patent: Oct. 3, 1995

[54] EXPANSION VALVE AND RECEIVER ASSEMBLY

[75] Inventor: Arthur A. Naujock, Livonia, Mich.

[73] Assignee: Chrysler Corporation, Highland Park, Mich.

[21] Appl. No.: 301,820

[22] Filed: Sep. 7, 1994

[51] Int. Cl.[6] .................................................. F25B 43/00
[52] U.S. Cl. ................................................ 62/509; 62/511
[58] Field of Search .......................... 62/509, 511, 527, 62/528

[56] References Cited

U.S. PATENT DOCUMENTS

| | | | |
|---|---|---|---|
| 2,335,694 | 11/1943 | Paquin et al. | 62/509 X |
| 2,936,790 | 5/1960 | Dahl et al. | 62/511 X |
| 3,525,234 | 8/1970 | Widdowson | 62/509 X |
| 3,919,859 | 11/1975 | Ross | 62/509 X |
| 5,159,821 | 11/1992 | Nakamura | 62/509 |
| 5,224,358 | 7/1993 | Yamanaka et al. | 62/509 |

*Primary Examiner*—William E. Tapolcai
*Attorney, Agent, or Firm*—Kenneth H. MacLean

[57] ABSTRACT

A two-way flow solenoid-controlled expansion valve and receiver assembly for a two-way flow heat transfer system employing a refrigerant comprises a receiver and a valve body mounted on the receiver having two inlet/outlet passages. Either one of the inlet/outlet passages may be connected to a heat exchanger that switches from a condensing mode to an evaporative mode on refrigerant flow reversal while the other of these passages is then connected to another heat exchanger that operates in opposite manner. The inlet/outlet passages are each adapted to receive refrigerant from a condensing heat exchanger and deliver same through a separate check valve to the receiver and a flow control valve arrangement including two flow control valves independently operated by a proportional solenoid is operable to route and regulate refrigerant flow from the receiver to the other inlet/outlet passage that is connected to the heat exchanger that is then in an evaporative mode. The combined expansion valve and receiver assembly is also adaptable for use in more widely used refrigerant systems not requiring reverse flow by omitting certain components and making minor modifications.

10 Claims, 2 Drawing Sheets

EXPANSION VALVE AND RECEIVER ASSEMBLY

TECHNICAL FIELD

This invention relates to expansion valves and receivers used in heat transfer systems employing a refrigerant as the working fluid medium and more particularly to a combined expansion valve and receiver assembly for a two-way flow refrigerant system and also a system with one-way flow and wherein the expansion valve is operated with a proportional solenoid.

BACKGROUND OF THE INVENTION

In a typical heat transfer system such as a motor vehicle air conditioning system, a refrigerant which serves as the working medium is cycled through an engine drive driven compressor, a condenser, a receiver, an expansion device and an evaporator in that order. The refrigerant is compressed while in a vapor state by the compressor and delivered to the condenser where it rejects heat and condenses to a liquid which then flows to the receiver. The receiver condenses any remaining refrigerant vapor as well as acts as a reservoir of refrigerant for the system and is also commonly provided with a desiccant to trap any water that may have entered the system. The condensed refrigerant from the receiver is then reduced in pressure by the expansion device and flows to the evaporator where it absorbs heat and changes phase from liquid back to vapor. The low pressure vapor then flows back to the compressor to repeat the cycle. In a heat pump system using these components but with an electric motor driven compressor and providing both cooled and heated air such as in an electrically powered passenger vehicle or living space, the flow is reversed with respect to the condenser and evaporator in a heat mode so that the refrigerant now absorbs heat in the former and rejects heat in the latter and the expansion device and receiver must be plumbed accordingly. Moreover, an additional expansion device may be needed to meet the different heat transfer demands depending on what mode the system is in; i.e. cooling or heating. The expansion device is normally separate from the receiver and the necessary plumbing including added valves becomes quite extensive in making the required alternative connections between the condenser, evaporator, receiver and expansion device(s).

In both types of systems, the expansion device plays a very important role in that it controls the refrigerant flow and thereby the amount of cooling and/or heating that can be achieved. Fixed opening expansion devices such as orifices or capillary tubes are used to minimize costs in certain applications but are not preferred where heat transfer efficiency and response to varying heat transfer demands takes priority. Far more desirable are expansion valves that provide a strategic variable flow rate in accordance with variable operating conditions to maximize the heat transfer efficiency of the system and provide cooling or heating according to demand.

There are various types of expansion valves including the pressure controlled diaphragm type utilizing a control pressure that changes with a critical temperature in the system such as at the outlet of the evaporator. In this type valve, the control pressure operates on a diaphragm to adjust the expansion valve opening to provide increased or decreased refrigerant flow to meet a current demand as reflected by this control pressure. Other types of expansion valves include those which are controlled by a solenoid that may be of either the on-off type that opens and closes the valve with a controlled pulse to regulate the flow or of the proportional type that is controlled by varying the power thereto to adjust the degree of valve opening to produce the desired flow. Another type expansion valve employs a stepping motor that operates like the proportional solenoid to provide controlled flow with a variable size valve opening. The most accurate control of flow is provided by the above solenoid and stepping motor controlled types but they typically lack in versatility in meeting the requirements of both a one-way flow and a two-way or reverse flow refrigerant system.

In addition, the conventional expansion valve is typically separate from the receiver and is not readily adapted for incorporation therewith where two-directional flow is required. Moreover, both the conventional expansion valves and receivers do not readily lend themselves to a simplified plumbing arrangement with respect to the system and each other where they are installed together as an assembly and are required to operate with reverse flow or flow in just one direction.

SUMMARY OF THE INVENTION

The present invention provides a two-way flow, proportional solenoid controlled, expansion valve and a receiver which are combined in a compact light weight assembly for a two-way flow refrigerant system. The combined expansion valve and receiver assembly operates equally well in both flow directions, requires only two plumbing connections in the system and is also readily adaptable with the omission of certain components and minor modifications to provide one-way flow at less cost but with the same accurate flow control in a one-way flow system. The assembly includes a valve body that is mounted on top of a receiver and has two inlet/outlet passages that are both adapted to deliver refrigerant to and from the receiver; i.e. either one of the inlet/outlet passages may be connected to a heat exchanger that switches operation from that of a condenser to that of an evaporator on reversal of the refrigerant flow direction while the other inlet/outlet passage is connected to another heat exchanger that switches heat transfer operation from that of an evaporator to that of a condenser on the refrigerant flow reversal.

The inlet/outlet passages are each adapted to deliver refrigerant through a separate check valve to the receiver and the flow from the receiver to these passages is controlled by a flow control valve arrangement having two flow control valves that are separately associated with the respective inlet/outlet passages but in a common manner with respect to the receiver. The flow control valves are operated by a proportional solenoid to establish flow direction and regulate refrigerant flow between the inlet/outlet passages wherein flow is received from the heat exchanger that is then in a condensing mode and delivered by one of the check valves to the receiver and thence from the receiver by controlled throttling action provided by one of the flow control valves to the other heat exchanger that is then in an evaporative mode.

The proportional solenoid independently operates the flow control valves to establish the proper flow direction from the receiver to the downstream heat exchanger with one of the flow control valves and also regulate this flow with this flow control valve according to that desired for the system. This is effected by each of the flow control valves co-operating with a separate valve port to provide a variable size flow control opening between the receiver and their associated inlet/outlet passage. The flow control valves are each biased by a separate return spring to normally close their respective valve port and are independently controlled by a valve actuator to open and regulate flow to their associated inlet/outlet passage when the receiver is receiving refrigerant through the other inlet/outlet passage.

The expansion valve actuator is connected to the armature of the proportional solenoid and is adapted to be operated with a controlled power supply to the solenoid to selectively abut with one or the other of the flow control valves according to the flow direction desired and wherein the selected valve is then opened by the actuator against its return spring and relative to its valve port to establish the proper flow routing from the receiver and also regulate this flow. The positioning of the valve actuator to operate the control valves is controlled by the power supplied to the proportional solenoid and wherein the power control may be effected by any suitable refrigerant control system with either manual or automatic on/off mode control and a controlled power supply for the solenoid in both modes. For example, the control system may include a computer that is imputed with one or more signals reflecting certain operating conditions such as a critical temperature(s) and/or pressure(s) in the refrigerant system and is programmed to provide controlled power to the solenoid to establish the desired flow direction and then effect certain flow control for a cooling mode under the influence of these signals and, alternatively, that for a heating mode. The combined expansion valve and receiver assembly is also adaptable for use in more widely used refrigerant systems not requiring reverse flow such as a motor vehicle air conditioning system by omitting one of the flow control valves, both of the check valves and certain passages in the valve body.

It is therefore an object of the present invention to provide a new and improved proportional solenoid controlled expansion valve and receiver assembly for a refrigerant system.

Another object is to provide a proportional solenoid controlled expansion valve and receiver assembly for a refrigerant system providing controllable flow direction and similar flow control in each flow direction.

Another object is to provide a combined proportional solenoid controlled expansion valve and receiver for a refrigerant system utilizing reverse flow wherein the valve provides two-way flow control and only two plumbing connections are required to connect the valve and receiver in the system.

Another object is to provide a compact expansion valve and receiver assembly for a reverse flow refrigerant system essentially comprising two flow control valves independently operated by a proportional solenoid and two inlet/outlet passages separately connected with the receiver by check valves.

Another object is to provide a combined proportional solenoid controlled expansion valve and receiver for a refrigerant system wherein the valve provides two-way flow control and optionally one-way flow control and only two plumbing connections are required to connect the valve and receiver in the system.

These and other objects, advantages and features of the present invention will become more apparent from the following description and accompanying drawings wherein:

DETAILED DESCRIPTION OF THE DRAWINGS

Figure 1:
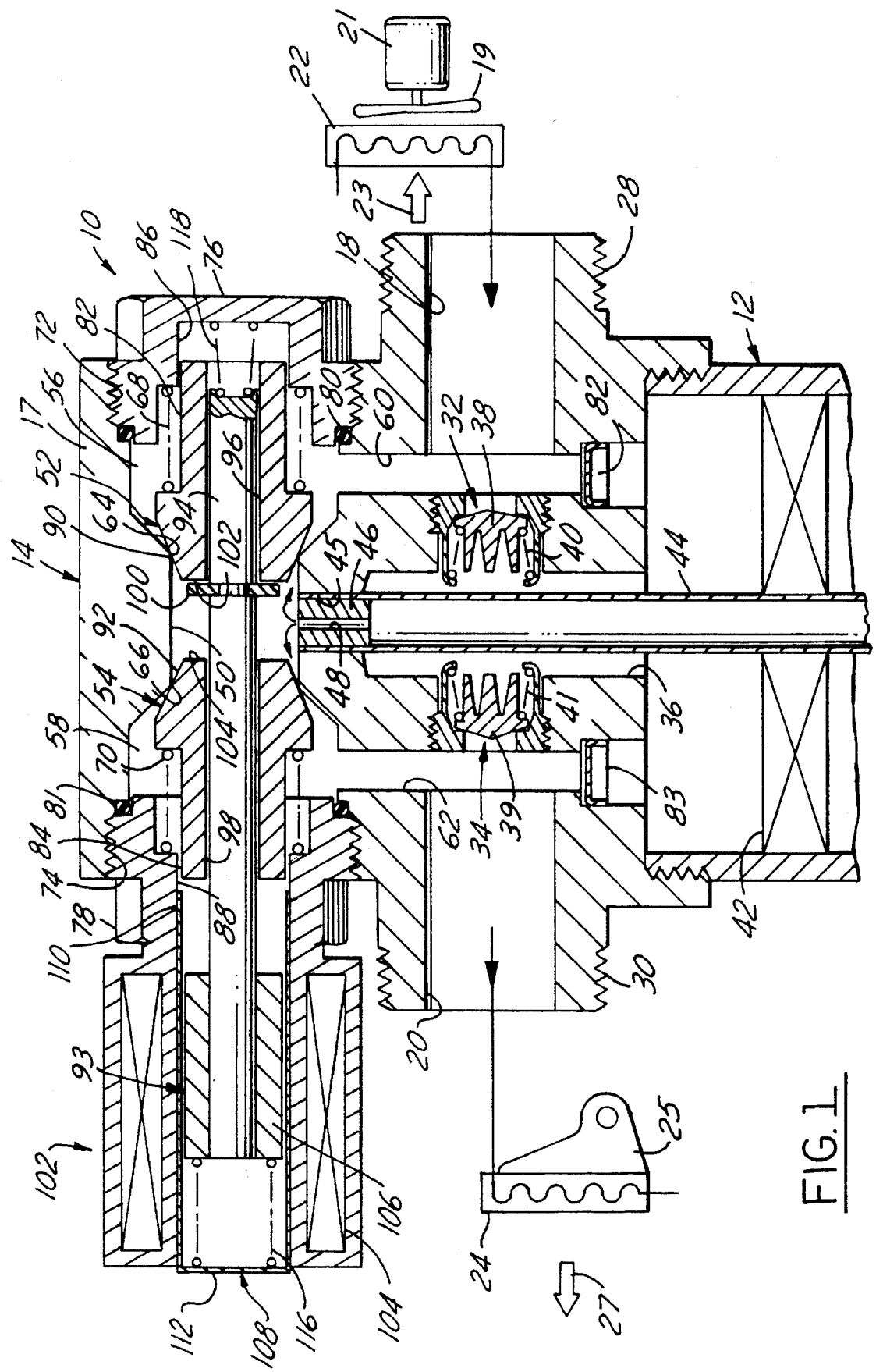
FIG. 1 is a cross-sectional view of a two-way flow expansion valve and receiver assembly according to the present invention connected as shown schematically to the heat exchangers in a reverse flow refrigerant system.

Referring to FIG. 1, there is illustrated a two-way flow expansion valve and receiver assembly 10 for use in a reverse flow refrigerant system such as a heat pump system in an electrically powered passenger vehicle wherein the refrigerant flow is reversed in the system with respect to the expansion valve and receiver on switching from a cooling mode to a heating mode and vice versa. The refrigerant system apart from the two-way expansion valve and receiver assembly 10 is of a conventional type and operates in a conventional well known manner and only those basic components to which the assembly is connected are shown as an aid in understanding the present invention.

The combined assembly 10 generally comprises a vertically oriented receiver 12 and a two-way flow expansion valve 14 mounted on the top of the receiver. The receiver 12 has a cylindrical shape with a closed lower end or bottom (not shown) and an open upper end 16 and the expansion valve 14 comprises a valve body 17 that is sealingly fixed to the upper end of the receiver with a press fit as shown or other suitable means such as mating threads or a weld. The valve body closes the upper end of the receiver and has two horizontally oriented inlet/outlet passages 18 and 20 extending at right angles to the receiver that provide the only necessary connections of the assembly in the refrigerant system. In connecting the assembly in the system, the inlet/passage 18 is connected to a heat exchanger 22 that serves as a condenser and alternately an evaporator on reversal of flow direction. A fan 19 driven by an electric motor 21 causes an air flow 23 through the heat exchanger 22 in either of the two modes of operation. The other inlet/outlet passage 20 is connected to a heat exchanger 24 that serves as an evaporator and alternately a condenser on such flow reversal. A blower assembly 25 passes an air flow 27 through the heat exchanger 24 in either of the modes of operation. In a first operative mode, the heat exchanger 24 supplies refrigerant to a refrigerant compressor (not shown) which in turn supplies refrigerant to the heat exchanger 22. In a second operative mode, a valve (not shown) reverses the flow whereby the heat exchanger 22 supplies refrigerant to the compressor which in turn supplies refrigerant to the heat exchanger 24. In the first mode, heat exchanger 22 is a heat rejector and heat exchanger 24 is a heat receiver. In the second mode, heat exchanger 24 is the heat rejector and heat exchanger 22 is the heat receiver.

The inlet/outlet passages 18 and 20 are aligned with each other and extend inwardly from the exterior of the valve body. The inlet/outlet passages 18 and 20 are adapted to be connected in the refrigerant system by a male thread 28 and 30, respectively, formed integral with the valve body and extending about the outer end of these passages. Refrigerant is delivered to the receiver 12 by one or the other of two identical check valve assemblies 32 and 34 depending on whether the refrigerant is being delivered from the heat exchanger 22 to the inlet/outlet passage 18 or from the other heat exchanger 24 to the other inlet/outlet passage 20. The check valve assemblies 32 and 34 are mounted in the inner end of the respective inlet/outlet passages 18 and 20 and on opening connect the respective passages to a vertically oriented central passage 36 in the valve body that is open to the upper end of the receiver. The check valve assemblies 32 and 34 include a valve 38 and 39 and a return spring 40 and 41, respectively. The valves are closed by their return spring which is preloaded in the check valve assembly and one or the other of these valves is opened by the refrigerant pressure in the associated inlet/outlet passage when that pressure exceeds the pressure in the receiver to an extent sufficient to overcome the check valve spring preload as will be described in more detail later.

The refrigerant delivered to the receiver is forced to pass through a desiccant containing assembly 42 mounted in the receiver 12 near the top thereof and any water that may have entered the system is adsorbed by the desiccant material to remove it from circulation. The refrigerant is delivered from the receiver by a vertically oriented liquid feed tube 44 that is centrally located in the receiver and extends through the desiccant containing assembly 42 to the bottom of the receiver. The feed tube 44 extends centrally through the valve body passage 36 past the check valve assemblies 32 and 34 and is attached at its upper end by a press fit or other suitable means in a vertically oriented bore 45 in the valve body located above and concentric with the passage 36. An insert 46 having an orifice 48 extending therethrough is fixed by a press fit or other suitable means in the upper end of the feed tube and provides restriction to the refrigerant flow from the receiver. Refrigerant exiting the receiver through the orifice 48 is delivered to a horizontally oriented cylindrical bore 50 in the valve body that is intersected by the feed tube accommodating bore 45 and extends parallel to and above the inlet/outlet passages 18 and 20 and is located between their inner ends.

The expansion valve 14 is operable to establish the flow of refrigerant from the receiver 12 to either the inlet/outlet passage 18 or 20 and also controls or regulates this flow and comprises a pair of identical oppositely arranged flow control valves 52 and 54 which are located at opposite ends of the bore 50 in a valve body cavity 56 and 58, respectively, formed inwardly from the exterior of valve body. The cavities 56 and 58 are connected by a vertically oriented passage 60 and 62 to the respective inlet/outlet passages 18 and 20 and are tapered at their inner end and intersect with the opposite ends of the bore 50 to define a circular port 64 and 66 at their respective juncture with this bore. The valve ports 64 and 66 are of the same size and located opposite the respective flow control valves 52 and 54. The flow control valves 52 and 54 are installed together with a return spring 68 and 70, respectively, through an opening 72 and 74 in the exterior of the valve body through which the respective cavities 56 and 58 are formed. The openings 72 and 74 are then closed and sealed by a cap 76 and 78 and an O-ring 80 and 81, respectively. The passages 60 and 62 are formed by a drilling operation in the valve body from the receiver side that intersects with the respective inlet/outlet passages 18 and 20 and the drill entry into the valve body is closed by a plug 82 and 83, respectively, to block the respective inlet/outlet passages from the receiver at these drill entry points.

The flow control valves 52 and 54 are slidably mounted in the valve body in concentric relationship with the respective valve ports 64 and 66 by being formed with a cylindrical body 82 and 84, respectively, that is slidably received in a bore 86 and 88 in the respective caps 76 and 78. The caps 76 and 78 also serve as a valve seat for the respective springs 68 and 70. The bore 86 terminates as a blind bore in the cap 76 but the bore 88 extends through the cap 78 to serve other purposes and is closed by other means as latter described. The flow control valves 52 and 54 are forced toward the respective valve ports 64 and 66 by their return spring and have a tapered valve face 90 and 92, respectively, that is engageable with the respective valve ports to close same as shown. The flow control valves 52 and 54 are moveable away from their respective valve port 64 and 66 against their return spring and their respective tapered valve face 90 and 92 then defines in co-operation with their respective valve port an annular valve opening that opens the bore 50 to the respective inlet/outlet passages 18 and 20 via the respective passages 60 and 62 and increases in size as the flow control valve is moved further away. The return springs 68 and 70 are identical and are preloaded by the respective caps 76 and 78 on installation of the latter to normally hold the flow control valves closed as shown.

The flow control valves 52 and 54 are operated independent of the refrigerant pressure acting thereon by an armature assembly 93 that includes an actuator rod 94 that is made of non-ferrous metal such as brass or aluminum and extends through the valve cavities 56 and 58 and the intermediately located bore 50. The flow control valves also support the actuator for sliding movement in the valve body to effect the flow control valve operation while the actuator also acts to guide movement of these valves relative to their valve port. The actuator 94 is in the form of a cylindrical rod and the flow control valves 52 and 54 have a central bore 96 and 98, respectively, receiving the actuator to locate the actuator concentric with the bore 50 and valve ports 64 and 66. Movement of the flow control valves by the actuator is with an abutting action provided by a snap ring 100 that is mounted in a groove in the actuator between the flow control valves. The snap ring 100 is abuttable with the inner end 102 and 104 of the respective flow control valves 52 and 54 to individually move one or the other against their return spring to open their valve port.

The actuator 94 is shown in FIG. 1 in a position starting to move the flow control valve 52 rightward with the snap ring 100 against this valve's return spring 68 to open the valve port 64 while sliding in the other flow valve 54 which is held closed against the other valve port 66 by its return spring 70 and the force of the refrigerant pressure in cavity 58 acting thereon against the force of the refrigerant pressure in bore 50. Alternatively, on movement of the actuator 94 in the opposite direction (leftward as viewed in the drawing), the snap ring 100 abuts with the other flow valve 54 to open the valve port 66 against the force of this valve's return spring 70 while the other return spring 68 and the refrigerant pressure in cavity 56 holds the flow valve 52 closed against the valve port 64 against the force of the refrigerant pressure in bore 50.

Movement of the flow control valve actuator 94 is effected by a proportional solenoid 102 of a conventional type having a coil 104 and an armature 106 wherein the armature is moved by the flux field through a distance proportional to the amount of power supplied to the coil. The solenoid 102 is mounted on the expansion valve body in axial alignment with the flow control valves 52 and 54 by a centrally located non-ferrous metal sleeve 108 that supports the armature within the coil. The mounting sleeve 108 has an end 110 that projects past the coil and is press fitted or otherwise suitably secured in the bore 88 of cap 78 which is extended therethrough for this purpose. The other end 112 of the sleeve is closed to retain the refrigerant in the assembly.

The actuator 94 extends through the bore 88 of the cap 78 and is press fitted or otherwise suitably secured in a central bore 114 in the armature 106 to form therewith the armature assembly 93. The armature assembly 93 is urged rightward by a large compression pusher spring 116 and in the opposite direction by a small compression return spring 118. The large spring 116 is located between the armature 106 at the one end of the one end of the actuator 94 and the closed end 112 of the sleeve 108 which serves as its seat and the small spring 118 is located between the other end of the actuator and the cap 76 which serves as its seat. The springs 116 and 118 are sized and preloaded to position and hold the armature assembly 93 in a rightward position from that shown where the flow control valve 52 is forced by the snap ring 100 on the actuator 94 to be moved thereby against its return spring 68 to open the valve port 64 to the widest extent possible when no power is being supplied to the coil 104. When power is supplied to the coil at a relatively high level, the flux field in the solenoid forces the armature assembly leftward against the large spring 116 and with the aid of the spring 118 to allow the return spring 68 to move the flow control valve 52 to close down this flow valve opening according to the exact movement of the armature assembly. This controlled valve closing movement is obtained by the valve return spring 68 maintaining the flow control valve 52 in engagement with the snap ring 100 until the port 64 is eventually closed at a certain increased power level at which point the flow control valve is released from the armature assembly at the snap ring 100.

Operation of the other flow control valve 54 is obtained by then further increasing the power to the coil 104 to move the armature assembly further leftward against the spring 116 so that the snap ring 100 then engages the end 102 of this flow control valve and moves it leftward against its return spring 70 to open the valve port 66 to the exact movement of the armature assembly and thus to a degree in proportion to the increase in power then supplied to the coil. To close down this flow valve opening, the power to the coil is then decreased to allow the spring 116 to move the armature assembly rightward allowing the return spring 70 to move the flow control valve 54 to close on the valve port 66 according to the rightward movement of the armature assembly. This controlled valve closing movement is obtained like with the operation of the other flow control valve by the return spring 70 maintaining the flow control valve 54 in engagement with the snap ring 100 until the port 66 is eventually closed at a certain reduced power level at which point this flow control valve is released from the armature assembly at the snap ring 100.

The proportional solenoid 102 may be connected to any suitable power controller that supplies a variable amount of power to move the armature assembly 93 and thereby the flow control valve actuator 94 in one and, alternatively, the other direction to position the flow control valves 52 and 54 to establish a desired flow direction and a desired variable amount of flow in that direction as will now be described with reference to operation of the heat exchangers 22 and 24. When the heat exchanger 22 is to be operated as a condenser and the other heat exchanger 24 as an evaporator and the refrigerant is thus desired to be delivered as a controlled flow from the former to the latter, power is supplied at a certain power level in a directional sense to the solenoid 102 to move the flow control valve actuator 94 leftward to engage the flow control valve 54 with the snap ring 100 and thereby move this valve against it return spring to open the valve port 66 thereby establishing flow in the direction indicated by the solid line arrows. In this movement of the actuator 94, it slides freely in the central bore 96 of the other flow control valve 52 relative thereto and is supported thereby in operating the flow valve 54. The refrigerant from the heat exchanger 22 enters the inlet/outlet passage 18 and the pressure of this flow opens the check valve 38 so that the entering refrigerant passes around the feeder tube 44 and through the valve body passage 36 into the top of the receiver. Any water in the refrigerant flowing from the heat exchanger 22 is trapped by the desiccant in the receiver and the liquid refrigerant collected in the bottom is forced to flow upward through the feeder tube 44 and out the orifice 48 into the bore 50 which is blocked at the one end by flow control valve 52 and has been opened at the opposite end by flow control valve 54. The refrigerant then flows from the bore 50 through the annular opening between the valve port 66 and the tapered valve face 92 of flow control valve 54 and thence via valve body passage 62 to the other inlet/outlet passage 20 and on to the heat exchanger 24 operating in an evaporator mode. In establishing this flow direction, the entering refrigerant pressure in inlet/outlet passage 18 acts in cavity 56 to assist the return spring 68 in holding the flow control valve 52 closed against the force of the refrigerant pressure in bore 50 and acts in the receiver to hold the check valve 39 closed against the pressure in the inlet/outlet passage 20. The size of the annular opening formed by the flow control valve 54 and valve port 66 determines the amount of flow to the inlet/outlet passage 20 with a throttling action and a resulting pressure drop and this opening is gradually variable in size because of the tapered valve face 92 and in proportion to the displacement of the actuator operated flow valve by the proportional solenoid. With the proper flow direction established, the power to the solenoid may then be varied to either decrease or increase the flow control valve opening to decrease or increase the flow as desired and wherein the return spring 70 maintains the flow control valve 54 against the snap ring 100 in both directions of its movement thereby with the actuator.

Flow direction and control in the opposite direction for when the heat exchanger 24 operates as a condenser and the other heat exchanger 22 operates as an evaporator is effected by operating the solenoid to move the actuator 94 in the opposite direction or rightward as viewed in the drawing to release the flow valve 54 and engage the other flow valve 52 in a similar manner with the snap ring 100. On release of the flow control valve 54 from the actuator 94, it is returned to and held in its closed position by its return spring 70 and then helps support the actuator 94 to operate the flow control valve 52 as the latter did for its operation. The actuator 94 on engaging the flow valve 52 with the snap ring 100 moves this flow valve against it return spring 68 to open the valve port 64 while the other flow valve 52 is held closed by its return spring 70 thus establishing flow in the direction indicated by the dash line arrows. In this movement of the actuator 94, it slides freely in the central bore 98 of the flow control valve 54 relative thereto and is supported thereby in operating the flow valve 52 in the same manner as the latter provided actuator support in operating the former. The refrigerant from the heat exchanger 24 enters the inlet/outlet passage 20 and the pressure of this flow opens the check valve 39 so that the entering refrigerant passes around the feeder tube 44 and through the valve body passage 36 into the top of the receiver. Any water in the refrigerant flowing thereto from the heat exchanger 24 is trapped by the desiccant in the receiver and the liquid refrigerant collected in the bottom is forced to flow upward through the tube 44 and out the orifice 48 into the valve bore 50 which is now blocked at the one end by flow valve 54 and has been opened at the opposite end by flow valve 52. The refrigerant then flows from the bore 50 through the annular opening between the valve port 64 and the tapered valve face 90 of flow valve 52 and thence via valve body passage 60 to the other inlet/outlet passage 18 and on to the heat exchanger 22 that is now operating in an evaporator mode. In establishing this flow direction, the entering refrigerant pressure in inlet/outlet passage 20 acts in cavity 58 to assist the return spring 70 in holding the flow control valve 54 closed against the force of the refrigerant pressure in bore 50 and acts in the receiver to hold the check valve 38 closed against the pressure in the inlet/outlet passage 18. And in the same manner as flow control valve 54, the size of the annular opening formed by the flow valve 52 and valve port 64 determines the amount of flow to the inlet/outlet passage 18 with a throttling action and a resulting pressure drop and this opening is gradually variable in size because of the tapered valve face 90 and in proportion to the displacement of the actuator operated flow control valve. With the proper flow direction established in what is a reverse direction from that provided by the flow control valve 54 previously described, the power to the solenoid may then be varied to either decrease or increase the flow valve opening provided by the flow control valve 52 to decrease or increase the flow as desired and wherein the return spring 68 maintains the flow control valve 52 against the snap ring 100 in both directions of its movement thereby with the actuator.

Since the combined expansion valve and receiver assembly 10 is capable of providing equivalent flow control in either direction, it thus makes no difference except in the control of the solenoid as to which one of the heat exchangers 22 and 24 the inlet/outlet passages 18 and 20 are connected. However, if the system is primarily used in either the cooling mode or the heating mode, it is then preferred that their connections be made so that the flow control valve 52 which is normally held open with the power off be the valve that establishes the refrigerant flow for the most used mode. Furthermore, it will be appreciated that there are no other required connections to install the assembly in the system to provide two-way flow with variable flow control in each direction.

Figure 2:
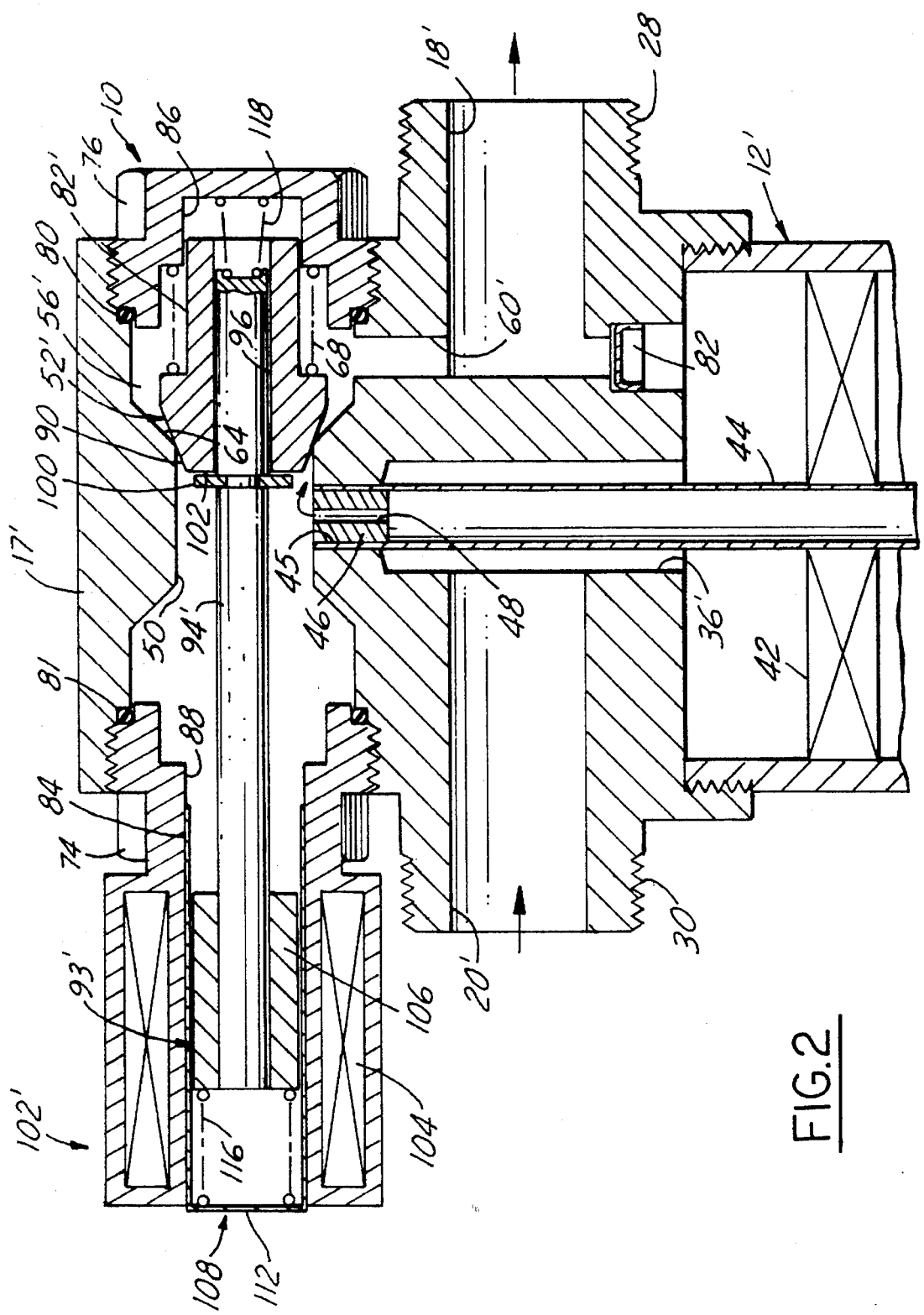
FIG. 2 is a cross-sectional view of another embodiment of the expansion valve and receiver assembly according to the present invention.

The compact expansion valve and receiver assembly is also readily modified to provide only single direction or one-way flow where reverse flow is not required. This is accomplished by simply omitting both of the check valve assemblies and one of the flow valves and its return spring and making simple modifications in the valve body resulting in an assembly of less parts and a simplified valve body to reduce the cost for this limited kind of use. This is illustrated by the embodiment in FIG. 2 wherein parts similar to those in FIG. 1 are identified by the same reference numbers only primed (N'). As shown in FIG. 2, the flow valve 52' that is most remote from the solenoid 102' is retained and remains operable with the armature assembly 93' as described above to establish and control flow in the direction of the arrows wherein flow is from the now single purpose inlet passage 20' to the now single purpose outlet passage 18'. The inlet passage 20' is now continuously open to the central passage 36' in the valve body leading to the top of receiver 12' and the outlet passage 18' is blocked therefrom by being formed as a blind bore in the valve body 17'. The former passage 62 and plug 83 together with the former check valve assemblies 32 and 34 and the flow valve 54 and its return spring 70 are all omitted and the passage 60' and the plug 82' are retained to connect the cavity 56' to the outlet passage 18'. The flow control valve 52' is preferably retained rather than the other flow control valve 54 as it is normally positioned to establish this flow direction when there is no power to the solenoid and also because it provides stable support for the armature assembly 93' at the end of the actuator 94' remote from the solenoid 102'.

The invention has been described in an illustrative manner with respect to presently preferred embodiments, and it is to be understood that the terminology that has been used is intended to be in the nature of words of description rather than words of limitation. Obviously, many modifications and variations of the present invention in light of the above teachings may be made. It is therefore to be understood that within the scope of the appended claims, the invention may be practiced otherwise than as specifically shown and described.

What is claimed is:

1. A compact electrically controlled thermal expansion valve and receiver assembly for a refrigerant system comprising a receiver and an expansion valve, said expansion valve including a valve body mounted on said receiver having an inlet passage for delivering refrigerant from a condenser to said receiver, an outlet passage for delivering refrigerant in said receiver to an evaporator, and a solenoid controlled flow control valve arrangement in said valve body adapted to regulate refrigerant flow from said receiver to said outlet passage, said valve arrangement including a valve port, a valve actuator, a flow control valve slidably mounted on said valve actuator, said flow control valve also slidably mounted in said valve body to thereby slidably support said valve actuator in said valve body, said flow control valve co-operable with said valve port to provide a valve opening between said receiver and said outlet passage that gradually increases in size in proportion to movement of said flow control valve in said valve body and relative to said valve port from a closed position where said flow control valve closes said valve port to a wide open position where said flow control valve is moved a substantial distance away from said valve port, a spring urging said flow control valve from said wide open position to said closed position, a proportional solenoid having an armature connected to said valve actuator adapted to move said valve actuator through distances proportional to the power supplied to said proportional solenoid, and said valve actuator having a valve engagement member that is abuttable with said flow control valve to move said flow control valve away from said valve port against said spring to increase the size of said valve opening in proportion to the power supplied to said proportional solenoid.

2. A compact electrically controlled thermal expansion valve and receiver assembly for a refrigerant system as set forth in claim 1 wherein said flow control valve has a central opening extending therethrough receiving said actuator, and said flow valve has a tapered valve face that co-operates with said valve port to vary the size of said valve opening.

3. A compact electrically controlled thermal expansion valve and receiver assembly for a refrigerant system as set forth in claim 1, further comprising a spring acting on said armature and valve actuator to hold said flow control valve in said wide open position when power is not being supplied to said proportional solenoid and resisting movement to said closed position when power is supplied to said proportional solenoid.

4. A compact electrically controlled thermal expansion valve and receiver assembly for a refrigerant system as set forth in claim 2, further comprising a cap closing an installation opening in said valve body for said flow control valve and said spring and also slidably supporting said flow control valve in said valve body and providing a seat for said spring.

5. A compact electrically controlled thermal expansion valve and receiver assembly for a refrigerant system comprising a receiver and an expansion valve, said expansion valve including a valve body mounted on and closing said receiver, said valve body having a first passage and a second passage that are both adapted to deliver refrigerant to and from said receiver, a first check valve in said valve body operable to open said first passage to said receiver, a second check valve in said valve body operable to open said second passage to said receiver, and a solenoid controlled two-way flow control valve arrangement in said valve body adapted to establish and regulate refrigerant flow from said receiver to said first passage and also adapted to establish and regulate refrigerant flow from said receiver to said second passage, said flow control valve arrangement including a first valve port and a second valve port adapted to open said receiver to the respective said first and second passage, a first flow control valve and a second flow control valve cooperable with the respective said first and second valve port to provide a first valve opening and a second valve opening between said receiver and the respective said first and second passage that gradually increases in size in proportion to movement of the respective said first and second flow control valve from a closed position where the respective said first and second flow control valve closes the respective said first and second valve port to a wide open position where the respective said first and second flow control valve is moved a substantial distance away from the respective said first and second valve port, a first spring and a second spring urging the respective said first and second flow control valve from its said wide open position to its said closed position, a proportional solenoid including an armature, a valve actuator connected to said armature and adapted therewith to be moved by said proportional solenoid in relation to both said flow control valves through distances proportional to the power supplied to said proportional solenoid, and said valve actuator having a valve engagement member that is separately abuttable with said first flow control valve and second flow control valve to move same away from the respective said first and second valve port against the respective said first and second spring to increase the size of the respective said first and second valve opening in proportion to the power supplied to said proportional solenoid.

6. A compact electrically controlled thermal expansion valve and receiver assembly for a refrigerant system as set forth in claim 5, further comprising a spring acting on said armature and valve actuator to hold one of said flow control valves in its wide open position when power is not being supplied to said proportional solenoid and resisting movement to its closed position when power is supplied to said proportional solenoid.

7. A compact electrically controlled thermal expansion valve and receiver assembly for a refrigerant system as set forth in claim 5, further comprising both said flow control valves having a central opening receiving said valve actuator and by which said flow control valves are slidably mounted thereon for movement with respect to said valve ports, both said flow control valves also slidably mounted in said valve body to thereby slidably support said valve actuator in said valve body for movement to control said flow control valves.

8. A compact electrically controlled thermal expansion valve and receiver assembly for a refrigerant system as set forth in claim 5, further comprising a first cap and a second cap that fits in an access opening in said valve body for the respective said first and second flow control valve and said first and second spring and also slidably supports the respective flow control valve and provides a seat for the respective spring.

9. A compact electrically controlled thermal expansion valve and receiver assembly for a refrigerant system as set forth in claim 5, further comprising an access opening extending through one of said caps, said proportional solenoid mounted on said one cap and closing said access opening to prevent the escape of refrigerant from said valve body, and said actuator having an end extending through said access opening connected to said proportional solenoid.

10. A compact electrically controlled thermal expansion valve and receiver assembly for a refrigerant system as set forth in claim 5, wherein said flow control valves and said springs are substantially identical.

* * * * *